US009071562B2

(12) United States Patent
Chung et al.

(10) Patent No.: US 9,071,562 B2
(45) Date of Patent: Jun. 30, 2015

(54) SEARCHABLE PEER-TO-PEER SYSTEM THROUGH INSTANT MESSAGING BASED TOPIC INDEXES

(71) Applicant: International Business Machines Corporation, Armonk, NY (US)

(72) Inventors: Albert A. Chung, Cary, NC (US); Venkata V. Gadepalli, Apex, NC (US); Richard E. Osowski, Jr., Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 13/706,794

(22) Filed: Dec. 6, 2012

(65) Prior Publication Data

US 2014/0164524 A1  Jun. 12, 2014

(51) Int. Cl.
G06F 15/16 (2006.01)
H04L 12/58 (2006.01)
G06F 17/30 (2006.01)
G06Q 10/10 (2012.01)

(52) U.S. Cl.
CPC ........ *H04L 51/046* (2013.01); *G06F 17/30657* (2013.01); *G06Q 10/107* (2013.01); *H04L 51/16* (2013.01)

(58) Field of Classification Search
CPC .. H04L 51/04; H04L 51/046; G06F 17/30657
USPC .................................. 709/206, 204, 203, 227
See application file for complete search history.

(56) References Cited

U.S. PATENT DOCUMENTS

| | | | |
|---|---|---|---|
| 8,069,134 B2 | 11/2011 | Swaminathan et al. | |
| 8,370,349 B2* | 2/2013 | Quoc et al. | 707/732 |
| 8,631,076 B1* | 1/2014 | Auerbach et al. | 709/206 |
| 2003/0088544 A1 | 5/2003 | Kan et al. | |
| 2005/0086290 A1* | 4/2005 | Joyce et al. | 709/202 |
| 2005/0235034 A1* | 10/2005 | Chen et al. | 709/206 |
| 2008/0046512 A1 | 2/2008 | Jones et al. | |
| 2009/0164449 A1 | 6/2009 | Huang | |
| 2009/0307325 A1 | 12/2009 | Szeto | |
| 2010/0174799 A1* | 7/2010 | Hewitt et al. | 709/206 |
| 2010/0235235 A1* | 9/2010 | Hosseini et al. | 705/14.49 |
| 2012/0259925 A1* | 10/2012 | Braudes | 709/206 |
| 2012/0331075 A1* | 12/2012 | Salmi et al. | 709/206 |

(Continued)

OTHER PUBLICATIONS

IBM, "SaND—Home Page" [online], [retrieved on Dec. 4, 2012]. Retrieved from the Internet <URL: https://www.research.ibm.com/haifa/projects/imt/social/sand.shtml>.

(Continued)

*Primary Examiner* — Ario Etienne
*Assistant Examiner* — Sahera Halim
(74) *Attorney, Agent, or Firm* — John W. Hayes; Jason H. Sosa

(57) ABSTRACT

An embodiment of the present invention, a computer receives, on a first computer, a request to locate a topic. The computer determines a second computer to query for the topic. The computer queries the second computer for the topic. The computer receives identification information of participants of an instant messaging conversation corresponding to the topic. The computer stores, on the first computer, the identification information of the participants and indexing the stored identification information by the topic.

16 Claims, 4 Drawing Sheets

(56) References Cited

U.S. PATENT DOCUMENTS

2013/0204876 A1* 8/2013 Szucs et al. ............ 707/738
2013/0246430 A1* 9/2013 Szucs et al. ............ 707/738

OTHER PUBLICATIONS

IBM, "Social Networks and Discovery (SaND)" Last Updated Dec. 22, 2009 [online], [retrieved on Dec. 4, 2012]. Retrieved from the Internet <URL: http://researcher.watson.ibm.com/researcher/view_project.php?id=691>.

IBM, "IBM R&D Labs in Israel | SONAR—SOcial Networking ARchitecture" [online], [retrieved on Dec. 4, 2012]. Retrieved from the Internet <URL: https://www.research.ibm.com/haifa/projects/imt/sonar/index.shtml>.

IBM, "Social Networks Architecture (SONAR)" Last Updated Mar. 30, 2010 [online], [retrieved on Dec. 4, 2012]. Retrieved from the Internet <URL: http://researcher.watson.ibm.com/researcher/view_project.php?id=917>.

* cited by examiner

SEARCHABLE PEER-TO-PEER SYSTEM THROUGH INSTANT MESSAGING BASED TOPIC INDEXES

FIELD OF THE INVENTION

The present invention relates generally to the field of instant messaging, and more particularly, to accessing information from stored conversations.

BACKGROUND OF THE INVENTION

Instant messaging (IM) is a way of communicating and transferring information between computing devices. Particularly in a corporate setting, instant messaging has become widely used to communicate, via electronic messages, in a timely matter. When a typical IM conversation ends, a transcript of the conversation may be stored in a file system located on the computer of a participant in the IM conversation. This information is not readily discovered and accessible by users of other computing devices.

An example of a conventional method for retrieving such information involves searching for key words or topics that correspond to an IM conversation stored on a central server. Similarly, in a peer-to-peer setting, one computer may directly query another, using key words, search terms, etc., for a matching IM conversation.

SUMMARY

Embodiments of the present invention disclose a method, computer program product, and computer system for searching instant message conversation histories stored in a local file system of a user based on topic indexes. A computer receives, on a first computer, a request to locate a topic. The computer determines a second computer to query for the topic. The computer queries the second computer for the topic. The computer receives identification information of participants of an instant messaging conversation corresponding to the topic. The computer stores, on the first computer, the identification information of the participants and indexing the stored identification information by the topic.

DETAILED DESCRIPTION

Figure 1:
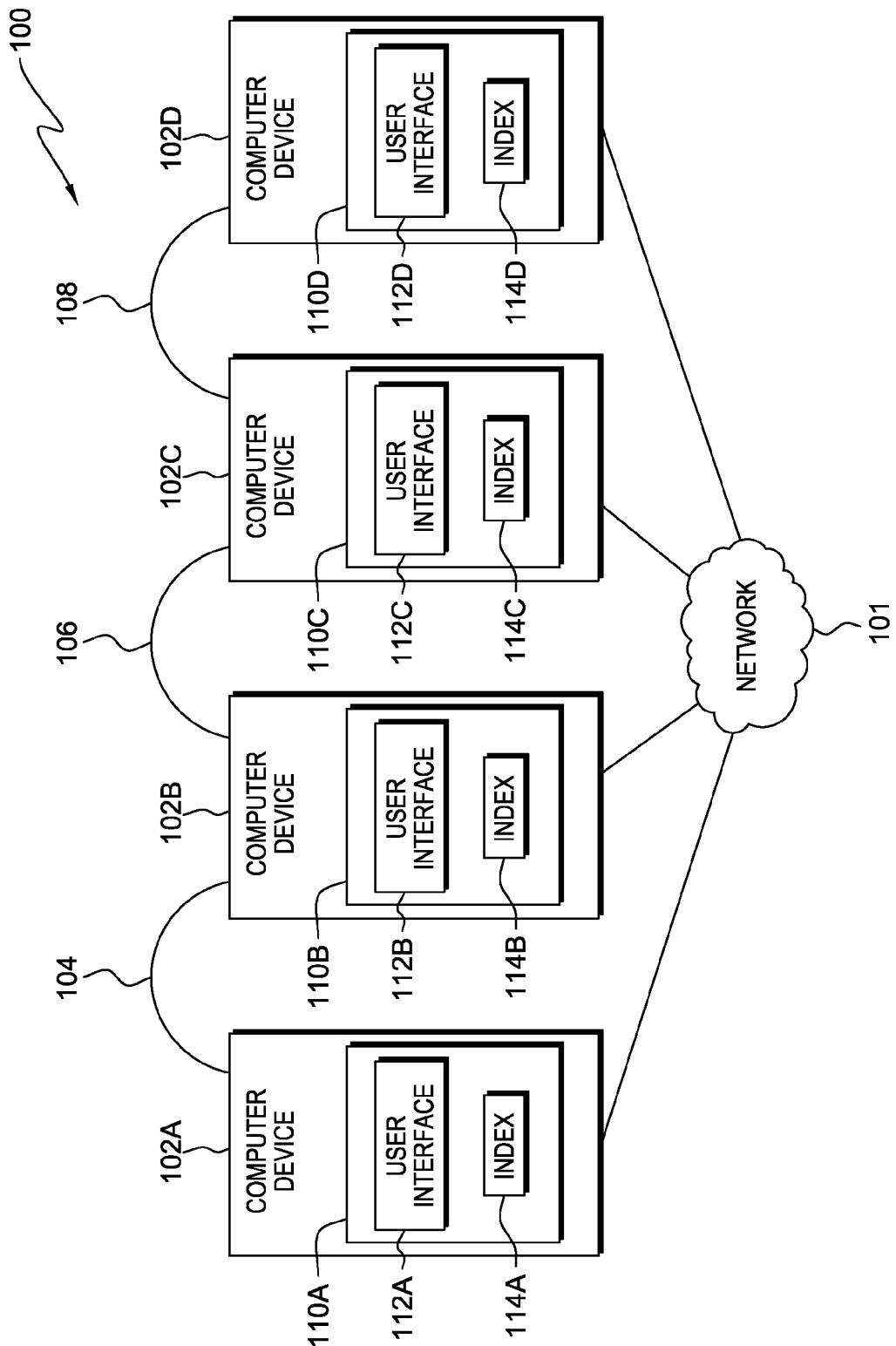
FIG. 1 is a functional block diagram illustrating a distributed data processing environment, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating a distributed data processing environment, designated 100, in accordance with one embodiment of the present invention.

In this embodiment of the invention, distributed data processing environment 100 includes multiple computer devices interconnected over network 101. Network 101 may be any collection of resources, including computers, components, connections, and protocols, that will support communication between computing devices, such as computer devices 102A, 102B, 102C, and 102D. Additionally, each computer device has a social network connection or relationship with at least one other computer device. For example, a user of computer device 102A may belong to the same social network as a user of computer device 102B. In the present application, belonging to the same social network includes being a contact in an Instant Messaging program. As depicted, computer device 102A has a social network connection or relationship with computer device 102B, represented by connection 104. Thus, a user of computer device 102A may have a user of computer device 102B listed as an IM contact and the user of computer device 102B similarly may have the user of computer device 102A listed as an IM contact. Computer device 102B has a social network connection to computer device 102C (connection 106), and computer device 102C has a social network connection to computer device 102D (connection 108). Each of computer devices 102A, 102B, 102C, and 102D may communicate with each other in a peer-to-peer (P2P) environment over network 101, for example, when communicating via an instant messaging program. Each of computer devices 102A, 102B, 102C, and 102D may be a laptop computer, tablet computer, netbook computer, personal computer (PC), a desktop computer, a personal digital assistant, a smart phone, or any programmable electronic device capable of participating in instant messaging.

IM index program 110 is a computer program for searching topic based IM conversation indexes in a P2P setting where a user can search for a topic without knowing where the topic is stored and who the participants were. Separate instances of IM index program 110 exist on each of computer devices 102A, 102B, 102C, and 102D and are represented as IM index programs 110A, 110B, 110C, and 110D, respectively. IM index programs 110A, 110B, 110C, and 110D include user interfaces 112A, 112B, 112C, and 112D respectively. User interface 112 receives input from a user (e.g., typed messages, selected options, etc.) and displays received messages to the user. IM index programs 110A, 110B, 110C, and 110D also include indexes 114A, 114B, 114C, and 114D respectively. Index 114 stores a topic of an IM conversation held between two or more participants. Index 114 is accessible to the computer device it resides on and to a computer device socially connected through a network to the computer device it resides on. For example, index 114A on computer device 102A is accessible to computer device 102B but is not directly accessible to computer devices 102C and 102D. Each index 114 comprises a list of topics corresponding to IM conversations. A user of IM index program 110 can establish security settings to allow only computer devices meeting specified criteria to access index 114.

Figure 2:
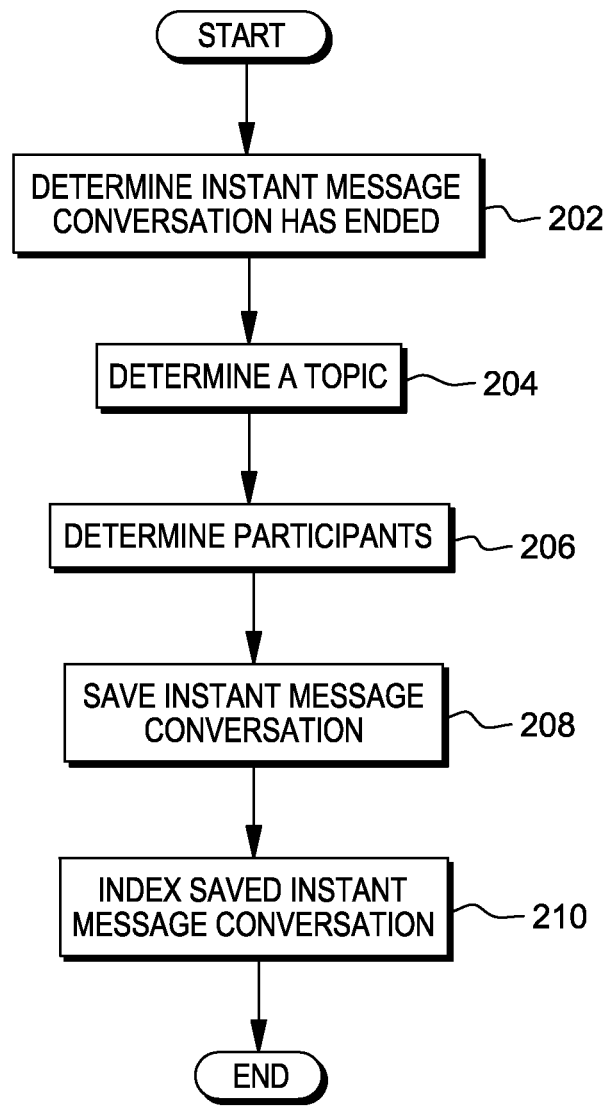
FIG. 2 is a flowchart depicting operational steps for storing and indexing an instant message conversation, on a computer device within the data processing environment, in accordance with an embodiment of the invention.

FIG. 2 is a flowchart, depicting operational steps for storing and indexing IM conversations, according to an exemplary embodiment of the present invention.

In an example, an IM conversation occurs between computer device 102A and computer device 102B and corresponds to a single topic. A transcript of the IM conversation may be stored by each participating computer device in association with the topic discussed, subsequently allowing the transcript to be retrieved by someone looking for information on the topic.

When an IM conversation occurs, IM index program 110, e.g., IM index program 110A and 110B in the above example, determines when the IM conversation has ended (step 202). Responsive to determining the instant messaging conversation has ended, IM index program 110 determines at least one topic of the IM conversation (step 204).

In one embodiment, participants of the IM conversation can manually specify a topic of or covered by the conversation. For example, after an IM conversation ends, IM index program 110 may prompt a user, via user interface 112, to enter the topic.

In another embodiment, determining a topic is done automatically by IM index program 110. For example, IM index program 110 may have a predetermined list of topics and match at least one of the topics to the IM conversation by identifying one or more key words used in the IM conversation. In yet another embodiment, a word used most frequently in an IM conversation (excluding common articles such as "the," "an," "a," etc.) may be determined to be the topic of the IM conversation.

IM index program 110 determines participants of the IM conversation (step 206). For example, other than the computer device on which IM index program 110 operates on, at least one other computer device participates in the conversation. IM index program 110 may determine not only the user names of the other participants, but also a corresponding IP address for each device a participant is connecting from, and potentially other contact information (email, phone, etc.). IM index program 110 saves the IM conversation (step 208). More specifically, IM index program 110 saves a transcript of the IM conversation and the identified participants of the conversation. IM index program 110 indexes the saved IM conversation by the determined topic (step 210). Thus, in the above example, each of computer devices 102A and 102B would ultimately have a transcript of the IM conversation indexed by the topic, and each device would reference itself and the other device (or the user of itself and the user of the other device) as a participant in the IM conversation.

Figure 3:
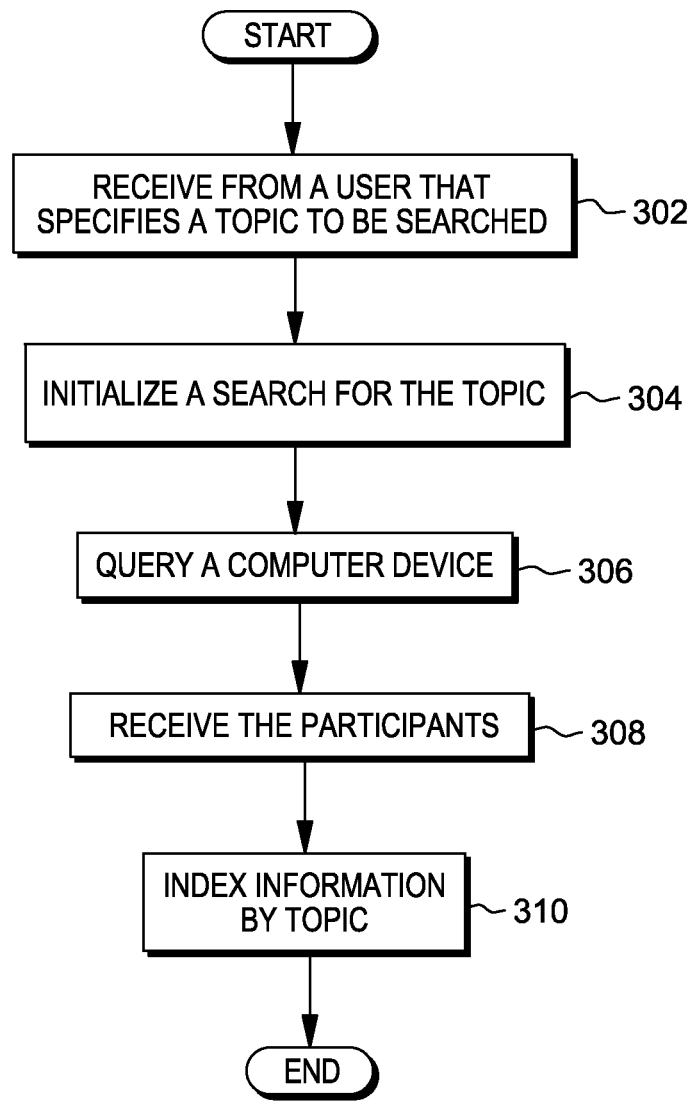
FIG. 3 is a flowchart depicting operational steps for an instant message index program locating a topic among a network of indexes, on a computer device within the data processing environment, in accordance with an embodiment of the invention.

FIG. 3 is a flowchart, depicting operational steps of obtaining relevant information through the use of IM index program 110, in accordance with an embodiment of the present invention. For example, a user of a computer device, such as computer device 102C, may want to find conversations pertaining to a specified topic from another computer device, such as the conversation saved on computer device 102A and 102B.

In a searching scenario, IM index program 110 receives a request from a user that specifies a topic to be searched (step 302). For example, a user can enter the topic through user interface 112. IM index program 110 initializes a search for the topic among IM conversation indexes of computer devices that have a social network connection or relationship with the computer device hosting IM index program 110 (step 304). For example, in an example where a user requests computer device 102C to search for a specific topic, IM index program 110C searches indexes of computer device 102B and 102D because both of these devices have a social network connection with computer device 102C. In a preferred embodiment, the social network connection is that a user of each of computer device 102B and 102C is in a contact list of the instant messaging program on computer device 102C.

Thus, after initializing the search, IM index program 110 queries a computer device having a social network connection with the computer device hosting IM index program 110 (step 306). IM index program 110 determines whether an index of the queried computer device contains the topic. Upon receiving a notification from the queried computer device that an index on the queried computer device contains the searched topic, IM index program 110 receives the participants of a conversation corresponding to the searched topic (step 308). In one embodiment, IM index program 110 may send a separate query for the participants after identifying the topic. In another embodiment, the participants might automatically be sent by an instance of IM index program 110 residing on the queried computer device. In either case, receiving the list of participants facilitates the user that performed the query to contact the participants of the pertinent conversation, as the participants might have a special knowledge of the topic by virtue of their participation in said conversation. In an example, if a user inputs a topic to search for on computer device 102C, computer device 102C might query the socially connected computer device 102B. Computer device 102B might have an IM conversation indexed by the searched for topic that occurred between computer device 102B and computer device 102A. Computer device 102C would receive from computer device 102B, the participants (e.g., user names and/or IP addresses, and other potential identifying information or contact information). The user of computer device 102C may use this information to directly contact a participant. In one embodiment, the user may also request the transcript of the IM conversation to learn the actual details of the conversation and/or to confirm that the IM conversation truly pertains to the topic that was searched for.

If IM index program 110 does not find the topic in an index of a queried computer device, IM index program 110 may determine another computer device to query based on a contact list of the hosting computer device.

Once IM index program 110 receives or identifies participants of a conversation corresponding to the searched topic, IM index program 110 stores information indicating that an IM conversation took place between the identified participants and indexes this information by topic (step 310). This ability to store, or index, that an IM conversation took place between participants, where the computer device storing this information is not a participant, expands the ability of every device connected to this network of computers to identify people with a specific type of knowledge. For example, in the scenario where computer device 102C searches for the topic, had computer device 102D searched for the same topic prior to the search by computer device 102C, computer device 102D would not have located anyone with potential knowledge of the topic. However, subsequent to computer device 102C indexing that users of computer device 102A and 102B participated in a conversation related to the topic, a search by computer device 102D would locate the topic on computer device 102C and reveal that computer devices 102A and 102B (or users of computer devices 102A and 102B) participated in the relevant conversation. Thus, the user of computer device 102D might directly communicate with any of the participants. Additionally, knowing an original participant of the IM conversation may allow the user of computer device 102D to query either computer device 102A or 102B for a transcript of the IM conversation.

In one embodiment, if a user of a computing device is not or will not be available, the computer device might offload, or "push", the stored index to a predetermined computer. For example, computer device 102B may push index 114B, potentially along with the stored IM conversations, to computer device 102C. By pushing index 114B to be included in index 114C, the topic and the IM conversation would still be available to be discovered by a user searching for the topic, for example on computer device 102D.

In another embodiment of the present invention, if IM index program 110 cannot find the topic in an index of a computer device on a contact list of the local computer device, IM index program 110 may direct an instance of IM index program 110 on a queried computer device to search for the topic. The instance of IM index program 110 on the queried computer device, as in normal operation, would begin a query of its own contacts for the topic, and if found, may return the applicable index information to the querying computer device. In such a fashion, the search for a topic may spiral outwardly along social contacts from one computer to the next, until the topic is found.

Figure 4:
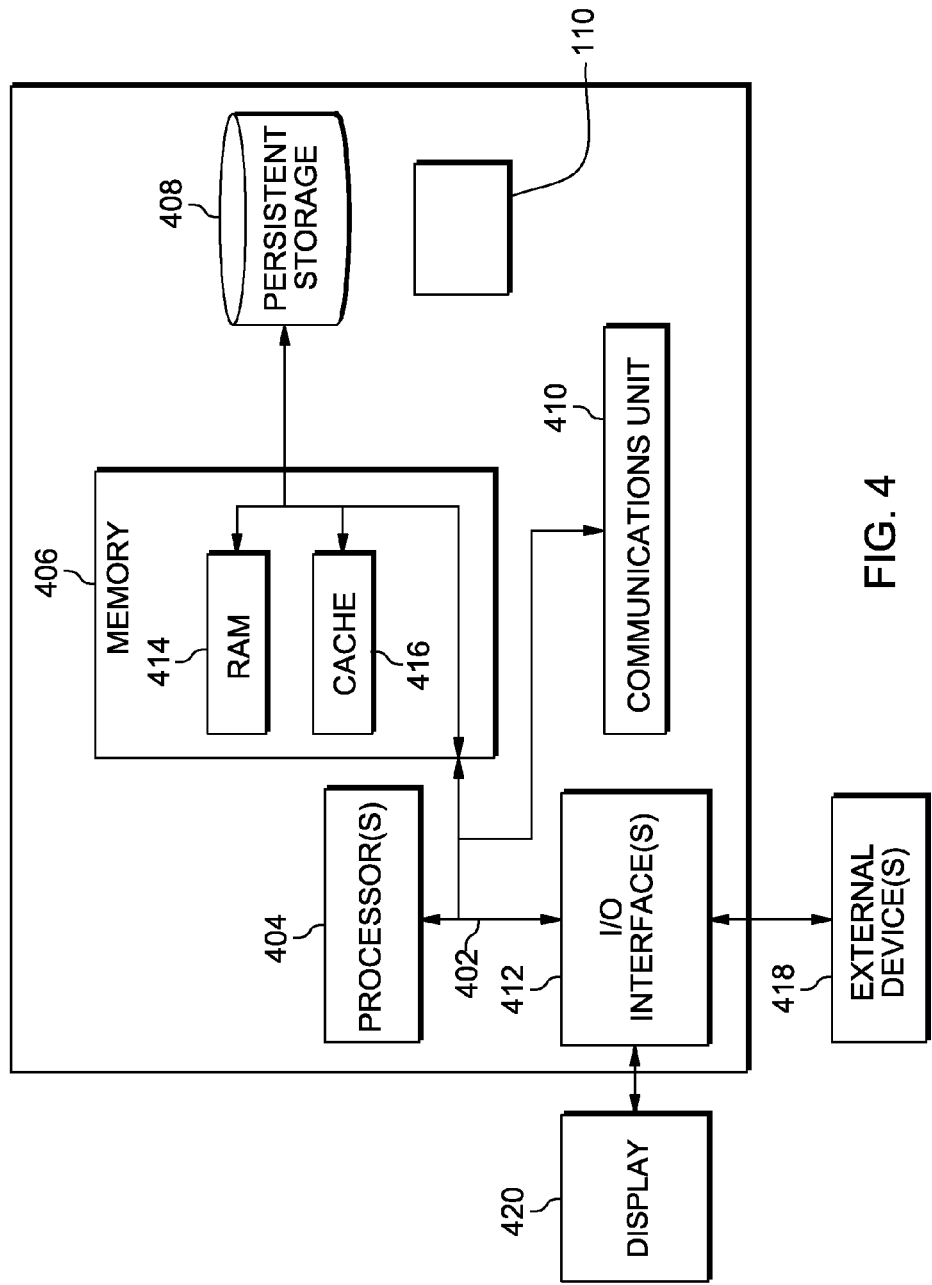
FIG. 4 depicts a block diagram of components of the computer device executing the instant messaging index program, in accordance with an embodiment of the present invention.

FIG. 4 depicts a block diagram of components of a computer device, such as computer device 102A, 102B, 102C or 102D, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Each of computer devices 102A, 102B, 102C and 102D includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

IM index program 110 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. IM index program 110 may be downloaded to persistent storage 408 through communications unit 410.

I/O interface(s) 412 allows for input and output of data with other devices that may be connected to one of the computer devices 102A, 102B, 102C and 102D. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., IM index program 110, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for locating information on a topic within a peer-to-peer network, the computer program product comprising:
one or more non-transitory computer-readable storage media and program instructions stored on the one or more non-transitory computer-readable storage media, the program instructions comprising:
program instructions to receive, on a first peer computer within the peer-to-peer network, a request to locate a topic;
program instructions to determine a second peer computer within the peer-to-peer network to query for the topic;
program instructions to query an index of the second peer computer for the topic;
responsive to determining the topic exists in the index of the second peer computer, program instructions to receive identification information of participants of an instant messaging conversation corresponding to the topic;
program instructions to determine the received identification information originated from a currently unavailable peer computer, wherein the currently unavailable peer computer previously pushed an index with the identification information to the second peer computer; and
program instructions to store, on the first peer computer, the identification information of the participants and indexing the stored identification information by the topic.

2. The computer program product of claim 1, further comprising, stored on the one or more non-transitory computer-readable storage media:
program instructions to receive, at the first peer computer, a query from a third peer computer within the peer-to-peer network for a separate topic;
program instructions to identify an instant messaging conversation stored on the first peer computer that corresponds to the separate topic; and
program instructions to send identification information of participants of the instant messaging conversation that corresponds to the separate topic to the third peer computer.

3. The computer program product of claim 1, wherein said receiving the request to locate the topic comprises, program instructions to receive the request from a third peer computer within the peer-to-peer network.

4. The computer program product of claim 1, further comprising program instructions, stored on the one or more non-transitory computer-readable storage media:
program instructions to request the transcript of the instant messaging conversation from a computer operated by one of the participants of the instant messaging conversation; and
program instructions to receive the transcript of the instant messaging conversation on the first peer computer.

5. The computer program product of claim 4, wherein the second peer computer is a computer operated by one of the participants of the instant messaging conversation.

6. The computer program product of claim 4, wherein the second peer computer is not a computer operated by one of the participants of the instant messaging conversation.

7. The computer program product of claim 1, wherein said determining the second peer computer to query for the topic, comprise program instructions, stored on the one or more non-transitory computer-readable storage media, to identify a user name in a contact list of an instant messaging program operating on the first peer computer, wherein the second peer computer corresponds to the user name.

8. The computer program product of claim 7, further comprising program instructions, stored on the one or more non-transitory computer-readable storage media:

prior to identifying the user name in the contact list, wherein the second peer computer corresponds to the user name;

program instructions to query a computer corresponding to a different user name in the contact list to locate the topic; and program instructions to receive a notification from the computer corresponding to the different user name that the topic has not been found.

9. A computer system for locating information on a topic within a peer-to-peer network, the computer system comprising:

one or more processors;

one or more non-transitory computer-readable storage media;

program instructions stored on the one or more non-transitory computer-readable storage media for execution by at least one of the one or more processors, the program instructions comprising:

program instructions to receive, on a first peer computer within the peer-to-peer network, a request to locate a topic;

program instructions to determine a second peer computer within the peer-to-peer network to query for the topic;

program instructions to query an index of the second peer computer for the topic; responsive to determining the topic exists in the index of the second peer computer, program instructions to receive identification information of participants of an instant messaging conversation corresponding to the topic;

program instructions to determine the received identification information originated from a currently unavailable peer computer, wherein the currently unavailable peer computer previously pushed an index with the identification information to the second peer computer; and program instructions to store, on the first peer computer, the identification information of the participants and indexing the stored identification information by the topic.

10. The computer system of claim 9, further comprising program instructions, stored on the one or more non-transitory computer-readable storage media:

program instructions to receive, at the first peer computer, a query from a third peer computer within the peer-to-peer network for a separate topic;

program instructions to identify an instant messaging conversation stored on the first peer computer that corresponds to the separate topic; and program instructions to send identification information of participants of the instant messaging conversation that corresponds to the separate topic to the third peer computer.

11. The computer system of claim 9, wherein said receiving the request to locate the topic comprises, program instructions to receive the request from a third peer computer within the peer-to-peer network.

12. The computer system of claim 9, further comprising program instructions, stored on the one or more non-transitory computer-readable storage media:

program instructions to request the transcript of the instant messaging conversation from a computer operated by one of the participants of the instant messaging conversation; and program instructions to receive the transcript of the instant messaging conversation on the first peer computer device.

13. The computer system of claim 12, wherein the second peer computer is a computer operated by one of the participants of the instant messaging conversation.

14. The computer system of claim 12, wherein the second peer computer is not a computer operated by one of the participants of the instant messaging conversation.

15. The computer system of claim 9, wherein said determining the second peer computer to query for the topic, comprise program instructions, stored on the one or more non-transitory computer-readable storage media, to identify a user name in a contact list of an instant messaging program operating on the first peer computer, wherein the second peer computer corresponds to the user name.

16. The computer system of claim 15, further comprising program instructions, stored on the one or more non-transitory computer-readable storage media:

prior to identifying the user name in the contact list, wherein the second peer computer corresponds to the user name;

program instructions to query a computer corresponding to a different user name in the contact list to locate the topic; and program instructions to receive a notification from the computer corresponding to the different user name that the topic has not been found.

* * * * *